Dec. 2, 1969  M. H. DORSEY  3,481,431
LUBRICATION SYSTEM
Filed Aug. 18, 1966
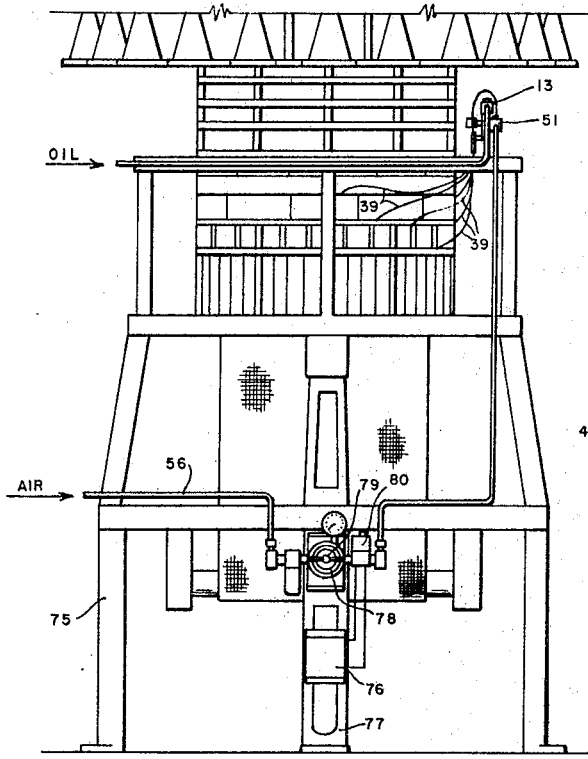
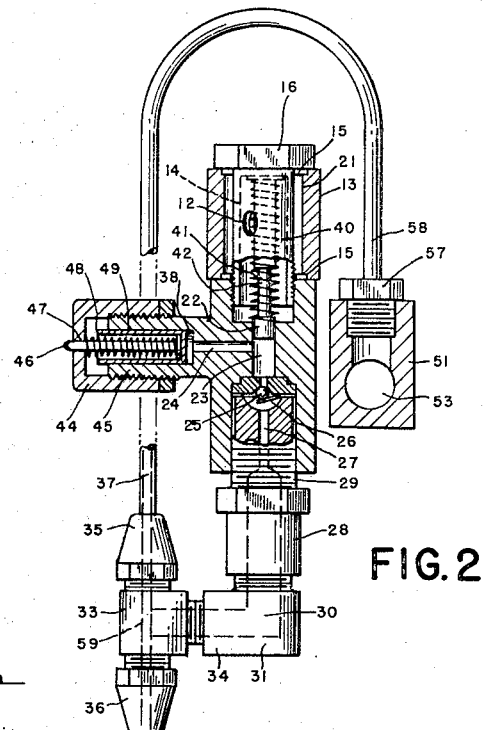
FIG. 1
FIG. 2
FIG. 3
FIG. 4
FIG. 5
FIG. 6

United States Patent Office 3,481,431
Patented Dec. 2, 1969

3,481,431
LUBRICATION SYSTEM
Mason H. Dorsey, 2500 Lucena, Charlotte, N.C. 28206
Filed Aug. 18, 1966, Ser. No. 573,232
Int. Cl. F01m 1/06; F16n 7/14; D04b 9/00
U.S. Cl. 184—7                                             10 Claims

ABSTRACT OF THE DISCLOSURE

A lubrication assembly for supplying a predetermined volume of air-atomized lubricant to remote locations on machine parts from a lubricant supply in which a lubricant metering device supplies a predetermined volume of lubricant to an accumulator from the lubricant metering device to be discharged in an atomized mist by pressurized air after the metered lubricant is retained in the lubricant accumulator.

---

This invention relates to a lubrication system of supplying air-atomized lubricant to surfaces to be lubricated and relates more particularly to a lubricating assembly for dispensing one or more metered volumes of lubricant and delivering the metered lubricant reliably to remote locations in highly atomized condition for full and complete lubrication of the areas to be lubricated in each cycle of operation.

Automatic lubrication of machinery has become vitally significant in high production machinery and in preventive maintenance as well as in plant engineering. Automatic lubrication systems that are dependable and capable of lubricating parts that are subjected to frictional engagement can drastically reduce plant operating costs by maintaining machinery in operating condition without reliance upon manual lubrication thereby reducing repairs and replacements caused by improper lubrication of bearings and other parts subject to wear and deterioration when deprived of lubrication. High production and continuously operating machinery requires dependable lubrication applied systematically and periodically with uniform application and volume of lubricant. Textile machinery, particularly circular knitting machines, operating continuously day after day and week after week, requires constant lubrication for sustained trouble-free operation.

There are presently lubrication systems capable of dispensing a spray mist oil, however, such systems are not provided with any suitable or reliable means for dispensing an accurately measured volume of lubricant at predetermined intervals of operation. Various types of nozzles permit the utilization of a fine mist of lubricant to be dispensed utilizing compressed air, however, slugs of lubricant may frequently be dispensed or discharged preventing uniform lubrication of the various parts to be lubricated. It has been found most desirable to produce a fine screen or cloud of oil in close proximity to the parts to be lubricated with the oil particles precipitating in finely atomized form on the parts and areas to be lubricated that normally are not usually or readily accessible for manual lubrication.

It is, therefore, an objective of this invention to provide a lubrication system and apparatus in which a lubricant cloud or screen may be provided at predetermined intervals in each cycle of operation with a premetered quantity of lubricant air-atomized and dispensed automatically to lubricate parts and components to be lubricated.

Another object of this invention is the provision of a lubrication system in which different volumes of lubricant may be dispensed automatically to different parts of machinery at predetermined intervals with the lubricant being provided in minute quantities of air-atomized particles discharged at suitable locations directly or indirectly on the parts to be lubricated.

Still another objective of this invention is to provide a cleaning and lubrication system in which the parts and areas to be lubricated may be cleansed by air under pressure prior to dispensing air-atomized lubricant on the cleansed parts and areas with the air-atomized lubricant being dispensed in metered quantities at predetermined intervals.

A further objective of this invention is to provide a lubrication system operable at predetermined intervals to dispense predetermined volumes of metered lubricant, and dispensing the metered lubricant through a plurality of individual lines to remote locations and dispensing the lubricant by means of air flow.

A still further objective of this invention is to provide an automatic lubrication system that is operable in predetermined cycles of operation for dispensing air-atomized, predetermined metered volumes of lubricant to various locations on machinery.

The present invention has been found particularly significant and adaptable on textile machinery such as on circular knitting machines which have a substantial number of knitting instrumentalities that operate under close tolerances generating substantial friction as the needles and sinkers slide continuously within grooves provided in the knitting machine cylinder and sinker bed. Adequate, dependable and frequent lubrication is required continuously to reduce downtime of the machines with lubrication being required at a multiplicity of areas in addition to the lubrication of the knitting instrumentalities. The utilization of air-atomized lubricant has been found to be most desirable to avoid droplets of lubricant being precipitated on the fabric thereby requiring further and additional treatment to the fabric to avoid defects. Other textile machinery may readily utilized the lubricating system of this invention including looms, spinning frames, cone winders, drawing frames, false twisting apparatus, and other yarn and fabric making equipment.

Other objectives and many of the attendant advantages of this invention will become more readily apparent to those skilled in the lubrication art from the following detailed description of this invention taken in conjunction with the accompanying drawing in which like characters of reference designate corresponding parts throughout the several views, and wherein:

FIG. 1 is a front elevational view of a lubrication assembly modular unit having a series of injectors mounted in side-by-side relationship embodying one form of this invention;

FIG. 2 is an enlarged, side elevational, and partial sectional view of a single injector modular unit illustrating the interior structure and operational sequence of the injector as lubricant is introduced and subsequently discharged therefrom;

FIG. 3 is a front elevational view of a large diameter circular knitting machine for outer wear fabrics illustrating one embodiment of a lubrication assembly in position for automatically lubricating various parts of the machine including a timer and solenoid assembly mounted on the base of the machine;

FIG. 4 is an enlarged, end elevational, and sectional view of one form of positioning utilizing serveral lubricant dispensing nozzles mounted adjacent to the knitting instrumentalities on a circular knitting machine;

FIG. 5 is an enlarged perspective and fragmentary view only of a lubrication line nozzle positioned to lubricate the needle cam surface and the engaging needle butts; and FIG. 6 is a schematic controlled diagram for one selected operation of the air-actuated oil lubrication apparatus illustrating, in block diagram form, the timer and solenoid controlled components.

Referring to the drawing and particularly to FIG. 1, there is illustrated a preferred embodiment of a lubricant metering device 10 in which a series of individual modular unit metering, lubricant-supplying injectors 11 is mounted in side-by-side relationship for receiving, at the inlet opening 12 of each injector 11, a supply of lubricant from a lubricant reservoir 13 that may be mounted directly over each inlet end 14 of an injector 11 for supplying lubricant to the injector opening 12. Suitable seals 15 are retained over the inlet end of each injector by means of the cap 16 preventing leakage of the lubricant and causing it to flow to the inlet openings 12 of the series of injectors through openings (not shown) in the reservoir 13 as lubricant is fed through the supply line 17 at one end 18 of the reservoir 13 while the other end 19 of the reservoir is sealed by a plug 20.

The injectors illustrated are of conventional construction such as those manufactured by Lincoln Engineering Company, Series SL–42, suitable for dispensing metered quantities of lubricant in small volumes. It is to be understood, however, that other types of injectors may be employed for low pressure or high pressure systems, and individual injectors may be utilized as well as a series of injectors depending upon the specific application.

Briefly the operation of the injectors 11 illustrated in FIG. 2 commences by the introduction of a lubricant under pressure into chamber 21 formed in reservoir 13 permitting lubricant to flow through the inlet openings 12 whereby upon application of suitable lubricant pressure, usually in excess of 500 pounds per square inch, the lubricant will be forced against the piston 22 urging it downwardly in chamber 23 until the top of the piston 22 exposes the communicating passageway 24 that leads to the lubricant storage chamber 38 permitting lubricant to flow into chamber 38 until a predetermined volume is received therein which volume is governed by the capacity of the adjustable volume chamber 38. A ball check valve 25 is positioned at the inlet 26 of the discharge passage 27 and functions to permit the flow of lubricant downwardly from the chamber 23 and into passage 27 but blocking return flow once the lubricant has been urged beyond the valve 25. The discharge passage 27 extends downwardly through the coupling 28 that is threadably secured to the nipple 29. A lubricant accumulator 30 formed in the coupling and elbow 31 receives lubricant discharged by the injector and retains the lubricant within the accumulator chamber 30 until it is removed by air evacuation to be described hereafter. An injector T-fitting 33 is threadably secured to the discharge end 34 of the accumulator 31 with line securing nuts 35 and 36 being threadably secured to the T-33 retaining the air inlet line 37 and the air and lubricant discharge line 39.

In each injector a piston 22 extends from the lubricant receiving chamber 40 and is normally held partially retracted within that chamber by means of spring 41 that encircles the piston rod 42 which spring bias is overcome by the introduction of lubricant to be received within the chamber 38 may be carefully controlled and metered by means of the threaded cap 44 that is retained on the threaded spindle 45 in which the chamber 38 and the passage 24 are formed. The volume of lubricant to be received and dispensed is controlled by adjusting the cap 44 which controls the displacement of the plunger 46 that is guidably retained by an opening 47 in one end of the cap 44, and a helical spring 48 encircles the plunger 46 to urge it and the piston sleeve 49 to the right in order to discharge any lubricant that may be retained in chamber 38 upon upward vertical movement of the piston 22 thereby forcing lubricant from chamber 38 into passage 23 for discharge on the next cycle of movement of the piston 22.

It has been found desirable to use a small high pressure air operated, single stroke pump that requires air for the forward stroke with the return stroke being spring powered such as models 82886 and 83668 of Lincoln Engineering Company to provide the requisite high pressure for the lubricant to introduce the lubricant from a suitable supply source to the lubrication metering device and series of injectors supplying the reservoir 13 with the lubricant under high pressure. The application of high pressure to the incoming lubricant supply will fill the lubricant reservoir 13 forcing lubricant into the inlet openings 12 in each of the injectors urging the piston 23 downwardly and supplying the requisite metered lubricant to the passage 24 and chamber 38 so that upon the next cycle, after the system is filled with lubricant, the requisite metered supply will flow through to the lubricant accumulator chamber 30 preparatory for discharge upon supply of air through the air line 37.

An air manifold 51 is mounted by suitable brackets 52 to the lubricant reservoir 13 and is provided with an air-receiving chamber 53 with one end 54 sealed with plug 55 and the other end provided with an inlet line 56. Inlet line 56 communicates with a high pressure source for the supply of air (not shown). A series of individual air line bushing 57 is threadably retained on manifold 51 for receiving a flexible air line 58 corresponding to each injector 11 for supplying air under pressure from chamber 53 through the same line 37 passed the junction 59 formed by the air passage and lubricant accumulator passage to the T 33. It will be readily apparent that highvelocity air passing through the T 33 will induce a vacuum in the lubricant accumulator 30 drawing all of the lubricant deposited therein into the discharge line 39, commingling the oil with the air and atomizing the oil in the discharge line 39 as it passes to a remote location for discharge on various parts and areas to be lubricated as an atomized fog, cloud or mist in very fine lubricant particles that may range from two to five microns approximately.

It will be readily apparent that each of the injectors 11 may be independently adjusted for the desired volume of lubricant to be dispensed on each cycle of operation with the individual lubricant accumulators 31 retaining the lubricant until the desired time for discharge in the cycle of operation. Suitable discharge nozzles 60 provided with positioning nuts 61 retained thereon may be securely fastened on suitable brackets 62 mounted on the machinery where convenient or the nozzle may be introduced into a drilled opening 63 in a cylinder wall 64 and retained therein as shown in FIG. 5 in order to lubricate needle butts 65 on needles 66 of a circular knitting machine providing the requisite lubrication adjacent to cam 67.

In FIG. 4 there is illustrated a plurality of individual discharge nozzles 60 located at various desirable locations to provide the requisite lubrication on various knitting instrumentalities including sinkers 68, needles 66, bits 70, and sinker butts 71. Obviously, other parts, components and assemblies may be lubricated on a circular knitting machine simply by positioning one of the nozzles adjacent to the area or parts to be lubricated.

One application of the present lubrication system is illustrated in FIG. 3 as attached to a circular knitting machine 75 in which only the outline thereof is illustrated and in which an automatic variable timer 76 is mounted on one of the machine legs 77 with an air line filter 78 being mounted above the timer directly in the path of incoming air flow through supply line 56. An air line regulator 79 is positioned after the filter 78 to control the inlet pressure prior to the automatic solenoid valve 80 which is controlled in its operation by the automatic variable timer 76 to open and close at predetermined intervals to supply air to the air manifold 51 mounted on the circular knitting machine adjacent to the lubricant reservoir 13.

Referring to FIG. 6, one desirable sequence of operation is illustrated in which a variable and adjustable automatic electrical timer 81 will energize, at predetermined intervals of time and duration, the solenoid valves 82 in the lubricant supply line and 83 in the air supply line permitting lubricant to be supplied from the pump 84 through the supply line 85 to the solenoid valve 82 in the lubricant supply side of the system through a suitable line 86 which corresponds to inlet line 17 to supply the lubricant reservoir 13. Air is supplied from a high pressure source 87, which may be a compressor, through the inlet line 88 through the solenoid valve 83 to the supply line 89 which corresponds to the inlet line 56 which leads directly to the air manifold 51. At the desired time signaled during each cycle by the timer 81, the solenoid valves 82 and 83 will be opened, in some instances the timer will open the air solenoid valve 83 to permit air into the manifold 51 initially for air cleaning certain of the parts to be lubricated before lubricant solenoid valve 82 will be actuated for supplying lubricant to the injector and ultimately to the lubricant accumulator 30. In other instances, the timer 81 will open the lubricant solenoid valve 82 permitting lubricant under pressure to be supplied to the lubricant reservoir leading to the individual injectors for supplying the predetermined quantities of lubricant to the lubricant accumulators. With the lubricant in the respective accumulators 30, air will be supplied when solenoid valve 82 is opened from the air manifold 51 forming high velocity air passage through the juncture 59 to remove lubricant from the accumulator 30 and pass it into the air-lubricant line 39 for ultimate discharge through the nozzles 60.

It will be readily apparent that many modifications may be made to the types of supply lines, the types of injectors, the form and placement of the manifold and reservoir described herein, and such modifications and variations are contemplated within the scope of the appended claims. It has been found desirable to utilize plastic flexible tubing for at least the air lines and at least some of the lubricant supply lines depending upon the pressures utilized.

What is claimed is:

1. A lubricant assembly for supplying a predetermined volume of air-atomized lubricant to remote locations on machine parts from a lubricant supply comprising: a lubricant metering device having inlet and discharge openings, means for supplying lubricant to said metering device inlet opening for a single dispensing application, a lubricant accumulator for receiving and retaining therein a single discrete metered quantity of lubricant from said device communicating with said discharge opening, intermittently operated means communicating with said lubricant accumulator for supplying air under pressure upon operation of said metering means to displace said single discrete metered quantity of lubricant in said accumulator to a remote location in an atomized lubricant-air mist, and means positioned at said remote location for ejecting the atomized mist to a designated area to be lubricated.

2. A lubrication assembly as claimed in claim 1, said device having means for controlling the quantity of lubricant flow under pressure.

3. A lubrication assembly as claimed in claim 2, said air supplying means including a line communicating with said lubricant accumulator and having a discharge end, and said ejecting means including a lubricant discharge nozzle on the discharge end of said line for directing air-atomized lubricant to a specific area to be lubricated in a cycle of operation.

4. A lubrication assembly as claimed in claim 1, said lubricant supplying means including a lubricant reservoir in juxtaposition and leading to the inlet opening on said metering means, and said air supplying means having an air manifold communicating with said lubricant accumulator.

5. A lubrication assembly as claimed in claim 1, said lubricant metering device having a series of individually adjustable lubricant metering injectors, each of said injectors having an inlet and discharge opening, a lubricant reservoir communicating with the inlet openings of said injectors, said lubricant reservoir being supported on said device, an air manifold supported adjacent to said device, an injector lubricant accumulator on the discharge end of each injector, an air line for each injector leading from said manifold to a corresponding injector-mounted accumulator and to a remote location for lubrication of machine parts whereby lubricant from each injector will be evacuated upon air flow through said manifold and air lines from each accumulator for air atomization and discharge.

6. A lubrication assembly as claimed in claim 5, means for supplying lubricant under pressure at predetermined intervals to said lubricant reservoir, and means for supplying air under pressure to said air manifold at predetermined intervals.

7. A lubrication assembly as claimed in claim 5, solenoid-controlled valves for said means for supplying lubricant under pressure and said means for supplying air under pressure, and timing means for controlling the cycle of operation for opening and closing of said valves at predetermined intervals for lubrication and air flow.

8. A lubrication system as claimed in claim 1, a solenoid-controlled valve means for admitting lubricant under pressure to said lubricant metering device at predetermined intervals, and solenoid-controlled valve means for admitting air under pressure to said air supply means.

9. A lubrication system as claimed in claim 8, and a lubrication timing cycle means for controlling the opening and closing of said valve means.

10. A lubrication assembly as claimed in claim 7, individual lines for conveying lubricant leading from each injector lubricant accumulator to a termination position adjacent to an area to be lubricated, a said ejector means including a lubricant dispensing nozzle on the line terminal position for directing air-atomized lubricant to the area to be lubricated and said lubricant reservoir at least partially enveloping a portion of all of said metering injectors.

References Cited
UNITED STATES PATENTS

| | | |
|---|---|---|
| 2,857,019 | 10/1958 | Almasi. |
| 3,013,633 | 12/1961 | Rotter. |
| 1,934,791 | 11/1933 | Butzler _____ 222—193 X |
| 2,667,236 | 1/1954 | Graves. |
| 2,725,734 | 12/1955 | Oberly _____ 66—8 |
| 2,954,146 | 9/1960 | Hullman _____ 222—193 |
| 3,145,803 | 8/1964 | Cobert. |
| 3,253,678 | 5/1966 | Osmond. |

FOREIGN PATENTS

| | | |
|---|---|---|
| 431,183 | 7/1935 | Great Britain. |
| 342,255 | 12/1959 | Switzerland. |

LAVERNE D. GEIGER, Primary Examiner

EDWARD J. EARLS, Assistant Examiner

U.S. Cl. X.R.

66—8; 184—56; 222—193; 239—338